ELECTRONIC AMPLIFIER NETWORK

Filed Aug. 9, 1954 3 Sheets-Sheet 1

INVENTOR
Hugo Romander
Flehr & Swain
ATTORNEYS.

Oct. 1, 1957 H. ROMANDER 2,808,473

ELECTRONIC AMPLIFIER NETWORK

Filed Aug. 9, 1954 3 Sheets-Sheet 2

INVENTOR
Hugo Romander
BY
Flehr & Swain
ATTORNEYS

Oct. 1, 1957 H. ROMANDER 2,808,473

ELECTRONIC AMPLIFIER NETWORK

Filed Aug. 9, 1954 3 Sheets-Sheet 3

INVENTOR
Hugo Romander
BY
Flehr & Swain
ATTORNEYS

United States Patent Office 2,808,473

Patented Oct. 1, 1957

2,808,473

ELECTRONIC AMPLIFIER NETWORK

Hugo Romander, Redwood City, Calif., assignor to Sierra Electronic Corporation, San Carlos, Calif., a corporation of California Application August 9, 1954, Serial No. 448,576

6 Claims. (Cl. 179—171)

This invention relates generally to power amplifier networks for operating in the radio frequency range, and such as are suitable for use in communication transmitters.

One of the problems encountered in the construction and operation of electronic amplifiers for communication transmitters, is the maintenance of a proper impedance match for different operating frequencies. Assuming, for example, that the amplifier is supplying radio frequency energy to a network including a filter and a load, an adjustment of the system to a different operating frequency may require adjustment of component elements of the filter to maintain a proper impedance match. It is well understood by those familiar with the operation of radio frequency amplifiers that an improper match causes inefficient operation, with loss of power supplied to the load. In copending application, Serial No. 330,808, filed January 12, 1953, in the name of Tjiske Douma, there is disclosed a coupling device suitable for application to radio frequency systems and which can be used to facilitate impedance matching. The present application makes use of a coupling device of the Douma type, and applies this device to an electronic amplifier network in such a manner as to facilitate maintenance of a proper match for any selected operating frequency.

In general it is an object of the invention to provide apparatus which facilitates adjustment of an electronic amplifier network for proper impedance match, whereby the network operates with maximum efficiency, and transfers maximum available power to the load.

Another object of the invention is to provide apparatus of the above character which is not subject to errors due ot inductive components of coupling means interposed between the plate circuit of the amplifier and the load.

Another object of the invention is to provide a simplified arrangement of the above character which is particularly adapted for use with amplifiers of the push-pull type.

Additional objects and features of the invention would appear from the following description in which the preferred embodiment of the invention has been set forth in detail in conjunction with the accompanying drawing.

Referring to the drawing.

Figures 1, 2:
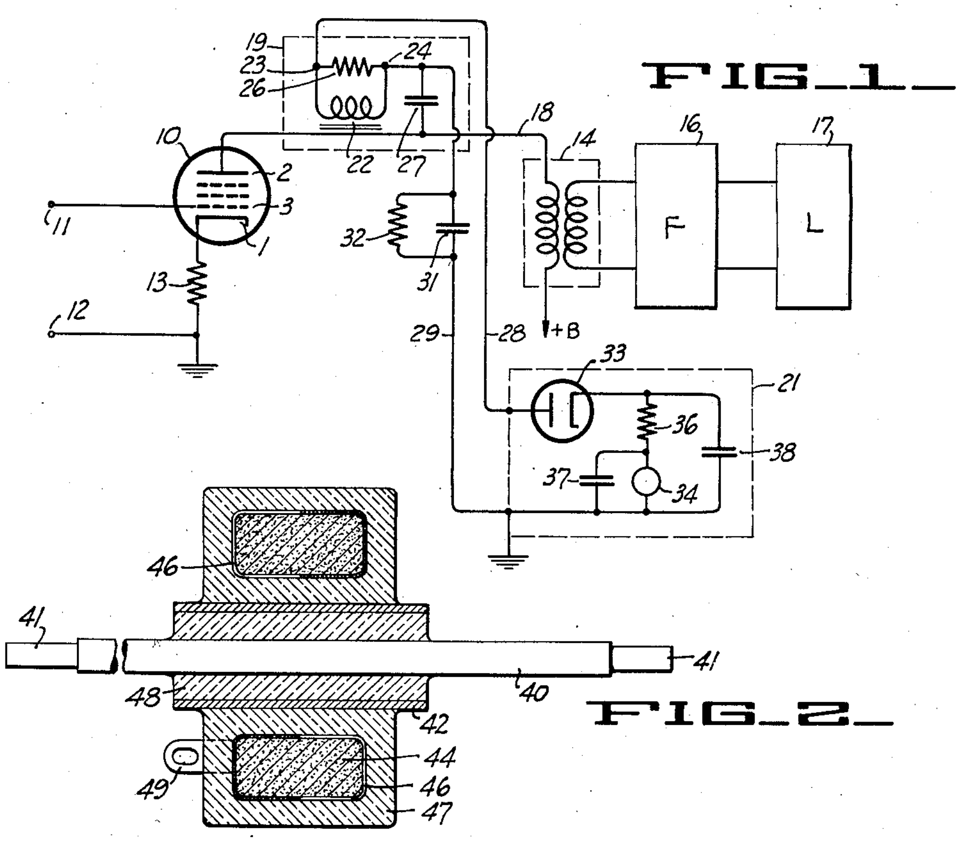
Figure 1 is a circuit diagram illustrating one embodiment of the invention.
Figure 2 is a side elevational view in section illustrating a coupling device which can be used in the circuit arrangement of Figure 1, and which corresponds to the coupling device disclosed in said copending application Serial No. 330,808.

The simplified network illustrated in Figure 1 consists of a vacuum tube 10 having cathode, plate and control grid elements 1, 2, and 3. In some instances the tube will have the additional screen and suppressor grids as illustrated. The input terminal 11 is shown directly connected to the control grid, and terminal 12 is grounded. The cathode is shown grounded through the cathode biasing resistor 13. Coupling means 14 serves to couple the output of the vacuum tube to the filter 16, which in turn connects with the load 17. It is assumed that the coupling means includes one or more inductive elements, and may for example be a simple transformer as illustrated which is non-resonant to the frequency of operation. The filter 16 may, for example, be of the pi type and contain component elements which can be adjusted to change the frequency of operation, and to adjust the impedance match with respect to the output of the vacuum tube. Assuming that the coupling means 14 is a simple transformer, one terminal of the primary connects to a source of plate voltage, and the other terminal connects to the plate of the tube by means of the plate lead 18.

The coupling device 19 of the Douma type is associated with the plate lead 18, and connects with the indicating means 21. Briefly the coupling device consists of a small current transformer 22, the winding of which connects to the terminals 23 and 24. These terminals are shunted by the resistor 26. A capacitor 27 is connected between terminal 24 and the lead 18. Leads 28 and 29 connect the terminals 23 and 24 with the indicating means 21. A capacitor 31, shunted by the resistor 32, is connected in series with the lead 29. The indicating means 21 consists of a suitable rectifier 33, such as a diode, together with a current indicating device 34 such as a microammeter.

The diode connects with lead 28, and the cathode connects with the meter through the resistor 36. The other side of the meter connects with lead 29. The meter is shown sunted by capacitor 37, and another capacitor 38 is shown connected between the cathode of the diode, and lead 29. Alternating voltages developed between the leads 28 and 29 are rectified by the diode 33, and additional elements associated with the meter 34, including the resistor 36 and the capacitor 38, provide means for integrating the rectified pulses.

The current transformer 22 provides means for deriving a voltage which is proportional to the plate current in the lead 18. Capacitor 27 together with capacitor 31 provides a voltage divider for obtaining a reduced voltage proportional to the voltage between lead 18 and ground. When a proper impedance match exists between the plate circuit and the impedance of the network as it appears looking from the plate, a null or zero reading is obtained for the meter 34, assuming that the voltages derived from winding 22 across resistor 26 and from the capacitance divider composed of capacitances 27 and 31 are designed to be equal and opposite in polarity under such conditions. When a proper match does not exist the phase relationship between the derived voltages differs from 180 degrees, or their amplitudes differ, or both, and this is indicated by a reading of the meter 34. To restore proper match it is necessary for the operator to make adjustments of one or more component elements of the filter 16. Restoration of proper match is indicated by a null reading, as explained above.

The inductive nature of the coupling means 14 provides one or more reactive elements which in effect are added to the reactive component elements of the filter 16. Because in accordance with the present invention the coupling device 19 is associated with the plate lead, the reactive nature of the coupling means does not interfere with obtaining a proper match. In other words, when the filter 16 is adjusted to obtain a null reading, the system is adjusted for proper match, because the inductive reactance represented by the coupling means 14 has automatically been taken into account.

Figure 2 shows an actual coupling device of the Duoma type which can be used in the arrangement of Figure 1. Briefly it consists of a central conductor 40 which has its end portions 41 formed to facilitate its insertion into the plate lead of the power amplifier. A cylindrical conductor 42 and a toroidal winding 46 are disposed concentrically about the conductor 40. The winding 46 is wound around a core 44 of suitable magnetic material such as ferrite, and in the form of a toroid. Winding 46 and core 44 form an inductance 43 which is embedded in a body 47 formed of suitable moldable plastic and this body is bonded to the sleeve 42. The sleeve is also bonded to the conductor 40 by the plastic 48. Suitable terminal tabs 49 can be carried by the body for making electrical connection with external parts of the circuit. The electrostatic capacitance between conductors 40 and 42 provides the capacitor 27 of Figure 1.

By way of example, I have utilized a coupling device of the type described above and having values as follows: Capactitors 27 and 31 have values of 10 $\mu\mu f.$ and 1490 $\mu\mu f.$ respectively. The inductance of the winding of the current transformer was 25 millihenries. Resistors 26 and 32 had values of 1000 and 16,700 ohms respectively.

Figure 3:
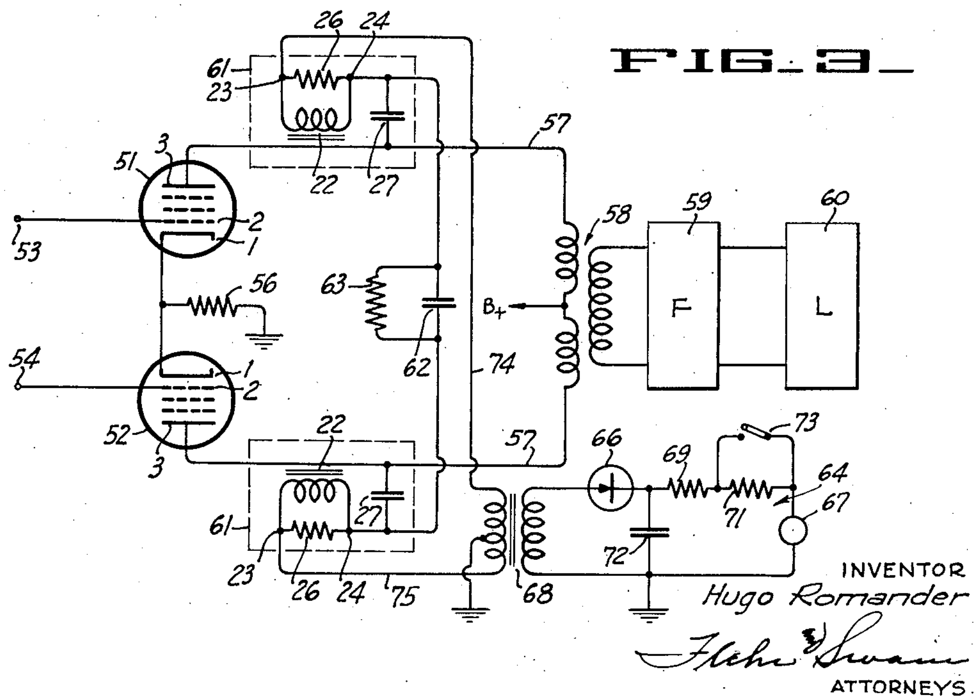
Figure 3 is a circuit diagram illustrating another embodiment of the invention in which the amplifier is of the push-pull type.

Figure 3 illustrates an electronic network incorporating an amplifier of the push-pull type. Thus vacuum tubes 51 and 52 in this instance have their control grids connected to the input terminals 53 and 54. The cathodes are shown connected to ground through the biasing resistor 56. The conductor leads 57 connect the plates of the tubes to the terminals of the coupling transformer 58. The center point of the primary winding of the transformer is shown connected to a source of plate voltage (B+). The secondary is connected to the filter 59, which in turn supplies radio frequency energy to the load 60. The coupling devices 61 are similar to the coupling means illustrated in Figure 1. Capacitor 62 and resistor 63 correspond to capacitor 31 and resistor 32 on Figure 1, and serve for both of the coupling devices 61. The indicating means 64 employs the rectifier 66 and the meter 67. The secondary of a transformer 68 has its one terminal connected to the rectifier 66, and its other terminal grounded and connected to the meter 67. The other side of the rectifier connects to the meter in series with the resistors 69 and 71, and also connects to ground through the capacitor 72. Resistor 71 can be shunted by the manual switch 73, to obtain a sensitivity adjusment. Terminals of the primary of transformer 68 connect with the leads 74 and 75, which connect respectively with the terminals 23 of the two coupling devices 61. The center tap on the primary of the transformer 68 can be grounded.

With the arrangement of Figure 3 the voltages derived from the two plate leads are combined for application to the detecting means 64. A condition of proper match is obtained for a null reading of the meter 67, and a condition of unmatch which is indicated by a reading of the meter can be corrected by making suitable adjustment of the filter 59.

Figure 4:
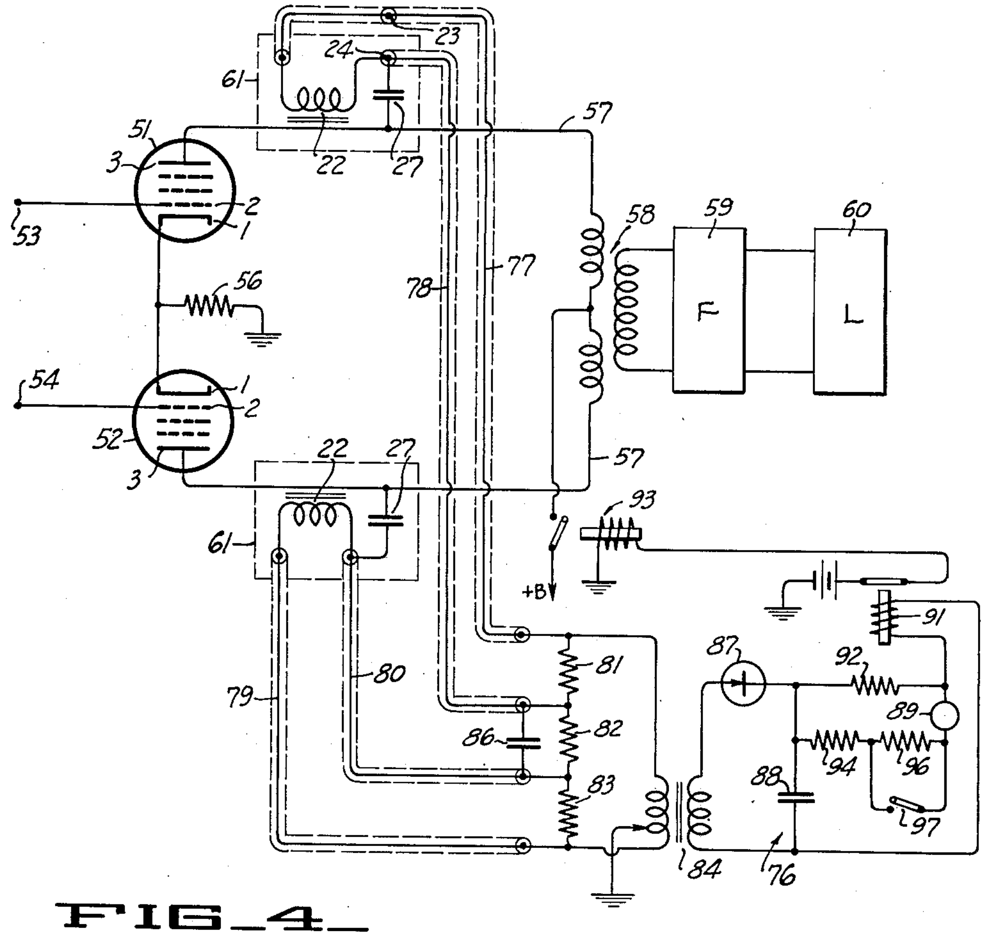
Figure 4 is a circuit diagram illustrating another embodiment of the invention in which the indicating means can be located remote from the amplifier.

In Figure 4 the invention is likewise applied to an amplifier of the push-pull type. However, in this instance the indicating means is located a considerable distance from the other parts of the amplifier. The coupling devices 61 are associated with the plate leads 57, the same as in Figure 3, and the associated resistors are disposed in proximity with the indicating means 76. The extended leads 77 and 78 connect respectively with the terminals 23 and 24 of the one coupling device, and similar extended leads 79 and 80 connect with the other coupling device. All of these leads are provided with grounded shielding as illustrated. The resistors 81, 82, and 83 are located near the indicating means 76. The resistors are serially connected, and the remote terminals are connected across the terminals of the primary winding of the transformer 84. Leads 77 and 78 are connected to the terminals of resistor 82, and leads 79 and 80 to the terminals of resistor 83. Resistor 82 is shunted by the capacitor 86. Resistors 81 and 83 take the place of the resistors 26 of Figure 3, and resistor 82 together with capacitor 86 take the place of resistor 63 and capacitor 62.

The rectifier 87 of the indicating means is included in a circuit including the indicating capacitor 88, and the meter 89. The rectified output is shown being applied to the winding of a relay 91, through the resistor 92. The relay is adjusted for marginal operation, and its contacts control the magnetic breaker switch 93, which has its contacts connected in series with the plate supply for the vacuum tubes. Thus an adjustment can be made to interrupt the plate supply to the tubes when the unbalanced condition is such as to endanger the system. The meter 89 is shown connected across resistor 92, in series with resistor 94 and 96. Resistor 96 can be shunted out by switch 97 to provide a sensitivity control.

It will be evident that the arrangement of Figure 4 operates in the same manner as Figure 3. However, the arrangement of Figure 4 is better suited for installations where the indicating means may be located at a remote point from the principal parts of the amplifier network.

Figure 5:
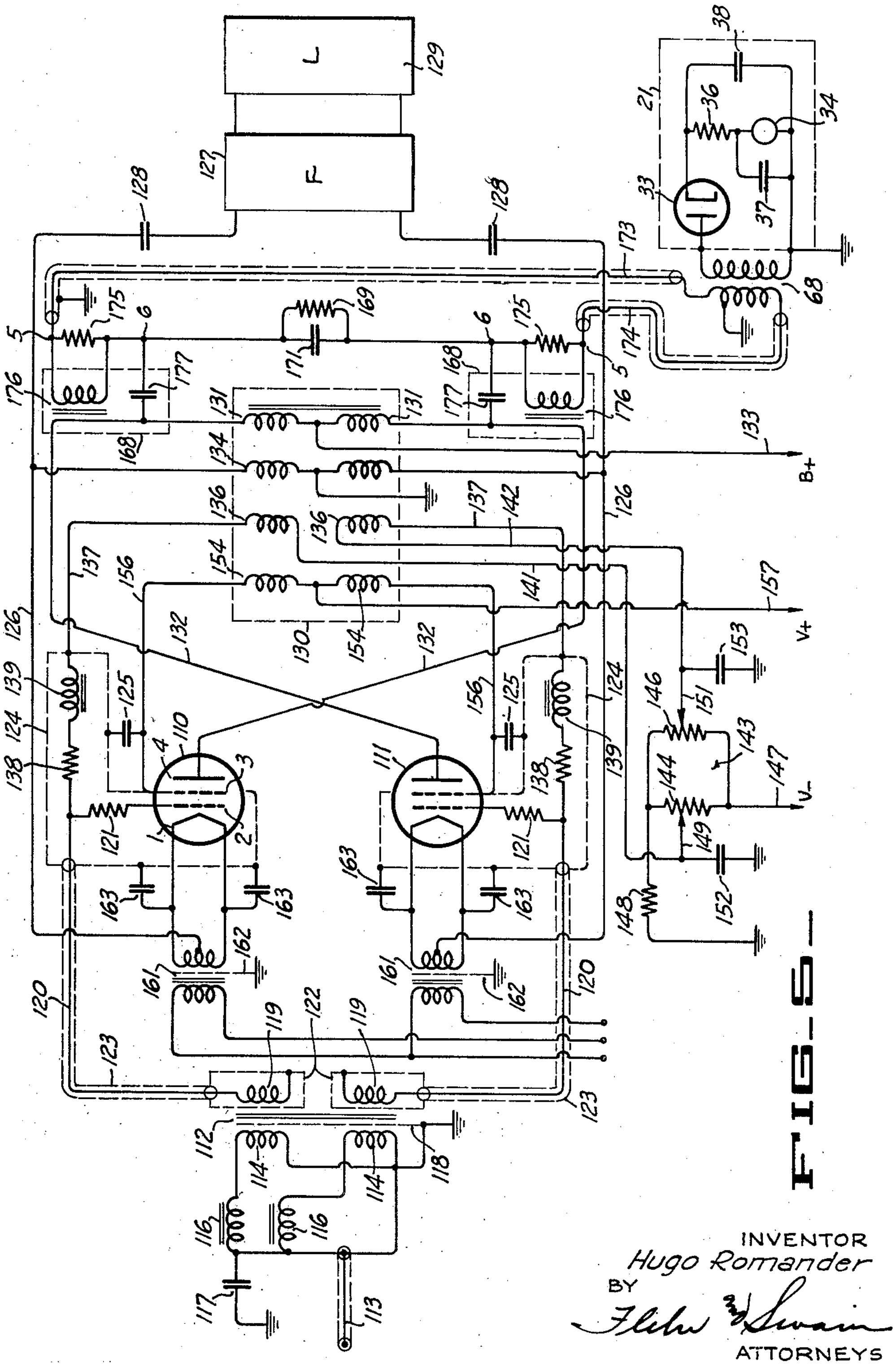
Figure 5 is a circuit diagram illustrating another embodiment of the invention in which the amplifier is suitable for frequencies ranging from 30 to 600 kc., and may have an output capacity of the order of 3 kw.

Figure 5 illustrates a network which has been used to advantage to secure power outputs of the order of 3 kw., at selected frequencies within a range of from 30 to 600 kc. The vacuum tubes 110 and 111 each have a cathode, control grid, screen grid, and plate elements 1, 2, 3, and 4. The input transformer 112 has divided primary and secondary windings, and the primary windings are coupled to the input lead 113. Thus the primary coils 114 have corresponding terminals grounded, and the other terminals connected to lead 113, through the inductances 116. Lead 13 is also connected to ground through the bypass capacitor 117. The primary coils 114 are electrostatically shielded from the core of the transformer by the grounded shielding 118.

The individual and ungrounded secondary coils 119 have corresponding terminals connected to the leads 120, which connect with the control grids of the tubes through damping resistors 121. Coils 119 are also provided with electrostatic metal shielding 122, which in both instances is connected to the other terminal of the associated coil and completely surrounds the respective coil. Tubular shielding 123 connects with shielding 122, and extends about each lead 120, to the additional electrostatic shielding 124. The latter shielding extends about certain electrical elements of the circuit, and also about the cathode and control grid of each tube. The main output leads 126 are coupled to the filter 127, through the coupling capacitors 128. The filter connects with the load 129.

An output transformer 130 has the remote terminals of its primary coils 131 cross-connected by conductor leads 132 to the plates of the tubes. The other terminals of coils 131 connect to the source of plate voltage through lead 133. Secondary coils 134 of the transformer 130 have their remote terminals connected to the leads 126, and adjacent terminals connected together and to ground. Supplemental transformer coils 136 serve as chokes, and have their corresponding terminals connected by leads 137 to the leads 120 in series with the resistors 138 and the peaking inductances 139. The latter elements are preferably enclosed within shielding 124, together with the damping resistors 121. The other terminals of the coils 136 are connected by leads 141 and 142 to means for supplying an adjustable bias voltage designated generally at 143. This means can include the potentiometers 144 and 146, which are connected in shunt. One side of the shunt arrangement connects to a source of biasing voltage by way of lead 147, and the other side connects to ground in series with resistor 148. Potentiometer tap 149 connects with lead 141, and tap 151 with lead 142. Also these leads are connected to ground through the bypass capacitor 152 and 153.

The output transformer also has a pair of supplemental coils 154 which have corresponding terminal leads 156 connected to the screen grids 3 of the tubes. The other terminals are connected by lead 157 to a suitable source of biasing voltage.

The cathodes of the two tubes are connected to the secondaries of the current supply transformer 161. The primaries of these transformers are connected to suitable alternating current supply lines. The center taps of the transformer secondaries are shown connected to the output leads 126. The secondaries are shown electrostatically shielded from the magnetic cores of the transformers by the grounded metal shielding 162.

The previously mentioned metal shielding 124 surrounds the resistors 121, and also the resistors 138 and the peaking coils 139. As schematically illustrated this shielding forms a shield about the corresponding cathode 1 and control grid 2. The terminals of each cathode are connected to the shielding by the bypass capacitors 163.

The coupling devices and the parts associated with the same are the same as illustrated in Figure 3. Leads 173 and 174 are shown provided with grounded shielding.

Arrangement of Figure 5 operates in the same manner as described with respect to Figures 1 to 3 inclusive. Briefly the transformer 112 is untuned, and the frequency of operation is determined by the exciting frequency, and the frequency to which the filter 127 is adjusted for passing energy to the load. By the adjustment of certain component elements of the filter 127, the impedance of the network, as it looks from the plate circuit, can be adjusted to match the plate circuit, and for any desired operating frequency over a substantial range, a null reading of the meter 67 always indicates a proper match. In other words, no error is introduced such as would be the case if the coupling devices 62 were inserted in the input leads to the filter.

I claim:

1. An electronic network comprising a power source having at least one output lead and a load electrically coupled thereto, means for indicating when the load has a predetermined impedance, said means comprising a current transformer inductively coupled to said lead and serving to derive a voltage which is proportional to the current flowing through said lead, said transformer including a winding which has first and second terminals between which the induced voltage appears, a capacitive voltage divider connected between a point of reference potential and said output lead for deriving a voltage proportional to the voltage applied to the load, an intermediate point on said voltage divider being connected to said first terminal of said transformer, said winding and capacitive divider being so chosen that the voltages developed across the portion of said voltage divider between said first terminal of said transformer and said point of reference potential and between said first and second terminals of said transformer when the load has a predetermined impedance are equal and opposite in phase, and indicating means connected between said point of reference potential and said second terminal of said transformer serving to detect the vector sum of said voltages and indicate when the load has the desired impedance.

2. Apparatus as in claim 1 wherein said indicating means comprises a meter, rectifying means serving to detect the vector sum of said voltages, and integrating means serving to integrate the rectified voltage and apply the same to the meter.

3. In an electronic network for the amplification of radio frequencies, an amplifier of the push-pull type including vacuum tubes having control grid, cathode and plate elements, the plates being connected to a plate circuit, a load, means for coupling the plate circuit to the load, means comprising current transformers coupled to the plate leads and serving to derive a voltage proportional to the current in said leads, each of said current transformers including a winding which has terminals between which the derived voltages appear, a resistor connected between said terminals, means comprising a capacitive voltage divider connected between one terminal of each of said windings and the associated plate lead to thereby develop a voltage which is proportional to the voltage on said leads, said windings and said capacitive divider means being so chosen that the voltages developed by the same when the load has a predetermined impedance are equal and opposite in phase, a capacitor connected between said one terminal of the two windings, a transformer, the primary of the transformer connecting the other terminals of said windings, indicating means connected to the secondary of said transformer, said indicating means serving to indicate when the load has the desired impedance.

4. Apparatus as in claim 3 in which said indicating means comprises a meter, rectifying means serving to detect the vector sum of said voltage appearing at the secondary of the transformer, and integrating means serving to receive said rectified signal and apply the same to the meter.

5. An electronic network comprising a power source having at least one output lead and a load associated therewith, means for indicating when the load has a predetermined impedance, said means comprising a current transformer coupled to said lead and serving to derive a voltage which is proportional to the current flowing therein, said transformer including a winding which has terminals between which the induced voltage appears, a capacitive voltage divider connected between one terminal of said transformer and the associated lead for deriving a voltage proportional to the voltage applied to the load, said winding and capacitive divider being so chosen that the voltages derived when the load has a predetermined impedance are equal and opposite in phase, indicating means serving to detect the vector sum of said voltages and indicate when the load has the desired impedance, and relay means connected to receive said detected voltage and serving to disable the power source when the impedance varies a predetermined amount from the desired impedance.

6. In an electronic network for the amplification of radio frequencies, an amplifier of the push-pull type including vacuum tubes having control grid, cathode and plate elements, the plates being connected to a plate circuit, means for applying a plate voltage to said plate circuit, a load, means for coupling the plate circuit to the load, means comprising current transformers coupled to the plate leads and serving to derive voltages proportional to the current in said leads, each of said current transformers including a winding which has terminals between which the derived voltages appears, a resistor connected between said terminals, a capacitive voltage divider associating one terminal of each of said windings to the associated plate lead to thereby develop a voltage which is proportional to the voltage of the lead, said windings and said capacitive dividers being so chosen that the voltages developed when the load has a predetermined impedance are equal and opposite in phase, a capacitor connected between said one terminal of the two windings, a transformer, the primary of the transformer connected between the other terminals of said windings, indicating means comprising a meter, rectifying means serving to detect the vector sum of said voltages appearing at the secondary of the transformer, and integrating means serving to receive said detected signal and apply the same to the meter, and relay means also connected to receive said integrated signal and serving to disable the amplifier when the impedance varies a predetermined amount from the desired impedance.

References Cited in the file of this patent

UNITED STATES PATENTS

| | | |
|---|---|---|
| 2,198,371 | Wolferz et al. | Apr. 23, 1940 |
| 2,412,393 | Ghosh | Dec. 10, 1946 |
| 2,624,780 | Byrne | Jan. 6, 1953 |